United States Patent [19]

Strauch

[11] 4,212,674
[45] * Jul. 15, 1980

[54] CORROSION PREVENTATIVE PIGMENT AND COMPOSITION

[75] Inventor: Dieter Strauch, Zofingen, Switzerland

[73] Assignee: Plüss-Staufer AG, Oftringen, Switzerland

[ * ] Notice: The portion of the term of this patent subsequent to Jan. 15, 1994, has been disclaimed.

[21] Appl. No.: 366,325

[22] Filed: Jun. 4, 1973

[30] Foreign Application Priority Data

Sep. 6, 1972 [DE] Fed. Rep. of Germany ....... 2228200

[51] Int. Cl.$^2$ .................................................. C09K 3/00
[52] U.S. Cl. .............................. 106/14.05; 106/14.18; 106/14.24; 106/14.31; 106/14.37; 106/14.44; 106/306; 106/308 N; 252/392; 252/394; 252/396; 427/220
[58] Field of Search ..................... 106/14, 306, 308 N, 106/14.05, 14.44, 14.45, 14.18, 14.24, 14.31, 14.37; 427/220; 252/392, 394, 396

[56] References Cited

U.S. PATENT DOCUMENTS

| | | | |
|---|---|---|---|
| 2,709,160 | 5/1955 | Korejwa et al. | 106/308 N |
| 2,841,504 | 7/1958 | Liggett | 106/308 N |
| 2,927,091 | 3/1960 | Liggett | 106/308 N |
| 3,514,304 | 5/1970 | Binnis | 106/14 |
| 3,793,044 | 2/1974 | Voskiul | 106/308 N |

*Primary Examiner*—Lorenzo B. Hayes
*Attorney, Agent, or Firm*—Pollock, Vande Sande and Priddy

[57] ABSTRACT

A material especially adapted for incorporation in a coating composition, for example, as a secondary pigment, and characterized in having corrosion inhibiting properties. The material consists of finely particulate material on which is coated a film of fatty amine or fatty amine salt. The material coated on the particles is characterized in having a high area to volume ratio and the properties thereof in respect of inhibiting corrosion are thereby enhanced. The particulate material is advantageously natural crystalline calcium carbonate.

11 Claims, No Drawings

CORROSION PREVENTATIVE PIGMENT AND COMPOSITION

The present invention relates to a material adapted for being incorporated in a corrosion inhibiting or preventing coating composition. In particular, the material according to the present invention is in the form of a pigment or a filler material.

The purpose of a corrosion preventative paint is to safeguard from corrosion metal parts which are of value or which are very sensitive to atmospheric influences. The term corrosion is quite generally understood to mean the destruction of metals and alloys, with the formation of metal compounds. Having regard to the tremendous amount of damage which is caused to metals of all kinds by corrosion, corrosion preventatives are gaining ever-increasing importance.

Rust-preventative paints do not generally provide completely impermeable films. In contrast, they are traversed by capillaries which allow ingress of atmospheric oxygen, water vapour, volatile acids, aqueous solutions, etc. Corrosion symptoms on the surface of the metal are not only encouraged but even accelerated thereby.

It is known to add mineral fillers to corrosion preventative paints. For example, if calcium is added to a paint as an extender, the film acquires a deposit of a weakly alkaline substance which can counteract corrosion on iron. By virtue of its weak alkalinity, calcium carbonate raises the pH value and so diminishes the hydrogen ion concentration of the aqueous solution which penetrates the film. With the addition of calcium carbonate as an extender to rust preventive primers, therefore, the necessary H+ ions for corrosion of the "$H_2$ type" are no longer available in sufficient quantity, so that $H_2$ type corrosion is retarded.

To reduce corrosion, particularly crystalline calcium carbonate is suitable, since, compared with chalk, it has the advantage of a smaller proportion of foreign electrolytes.

The use of calcium carbonate, even of crystalline calcium carbonate, does however have the disadvantage of a pronounced tendency towards sedimentation and of inadequate wettability with binders, e.g. alkyd resins.

Further disadvantages reside in the low acid resistance and the ever-present residual moisture which renders use in various binder systems difficult. Furthermore, sprinkling capacity in automatic dispensing plants is inadequate.

Furthermore, it is known to use fatty amines, particularly fatty amine salts, as corrosion preventives. The interface active cations of the fatty amine type absorb from aqueous and oily systems substantively on metals. A cohesive firmly adhering film is thereby formed which protects the surface of the metal from attack by aggressive liquids and gases. For protection against corrosion, not only the constitution of the fatty amine is important, but also the acid used for neutralization. It has already been proposed to use fatty amine salts also for rust protective paints.

The fatty amines or fatty amine salts which are suitable as corrosion preventive media have in particular the disadvantage of being comparatively difficult to produce and of being very expensive. The cost ratio of calcium carbonate to fatty amine salt is currently around 1:20. It is therefore obvious that fatty amines and fatty amine salts have not hitherto succeeded in acquiring any industrial importance as corrosion proventive media.

It is therefore an object of the present invention to provide a corrosion preventative secondary pigment which is usable together with corrosion preventive primers and which does not have the above disadvantages and which therefore particularly affords a marked improvement in corrosion resistance.

According to the invention, this problem is resolved in that the corrosion preventative secondary pigment consists of natural crystalline calcium carbonate which is surface treated with a fatty amine salt or a mixture of fatty amine salts.

The surface treatment of the $CaCO_3$ with the fatty amine salt can be carried out by any suitable process which leads to a film-like coating of the $CaCO_3$ particles, to guarantee that the greatest possible surface area of the active fatty amine salt is produced, e.g. by spraying on a solution of the amine.

Surface treatment of a crystalline calcium carbonate produces a hydrophobic end product which is water repellant and which can be used in corrosion preventive primers, particularly rust preventive primers, and has a good suspension capacity. Furthermore, the surface treatment contributes towards better dispersing a crystalline calcium carbonate in an oily binder and in improving the sprinkling properties in automatic dispensing plants.

An extraordinary multiplicity of fatty amines and fatty amine salts are being currently marketed as rust preventive media. However, it is not known which particular fatty amines or fatty amine salts are specially suited to specific tasks.

Therefore, a further object of the invention is, from the multiplicity of fatty amines and fatty amine salts, to find a fatty amine or a fatty amine salt which, in combination with crystalline calcium carbonate, is quite particularly suitable as a corrosion preventative secondary pigment, being superior to other amines.

According to the invention, this problem is resolved in that for the surface treatment of a crystalline calcium carbonate 0.5 to 10% by weight of a fatty amine salt of the general formula

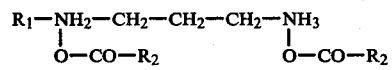

wherein $R_1$ is $CH_3-(CH_2)_n$ wherein n is an integer from 15 to 17; and $R_2$ is $CH_3-(CH_2)_7-CH=(CH_2)_7$; or N-octadecene (9) yl-1,3-propanediammonium dioctadecene (9) ylate, or mixtures thereof.

It has been found particularly advantageous to use crystalline calcium carbonates with a granulation in the range of 0.1 to 20μ.

Active pigments and the corrosion preventative secondary pigment according to the invention can be used in various mixture proportions. Preferably, the active pigment is replaced by the secondary pigment according to the invention, in the proportion of 50% by volume.

Within the scope of the invention, other conventional fillers, e.g. kaolin, barium sulphate, talcum, dolomite or quartz flour can be used as carriers if, in an individual case, these are preferred to the use of natural crystalline calcium carbonate.

Of the extraordinarily numerous comparative tests which have been carried out in approximately two and a half years of the most intensive research work, a few essential examples will be listed hereinafter:

Firstly, a natural calcium carbonate with a grain spectrum of 0.1 to 20μ was prepared. This was surface treated with in each case 3% of the following mixtures of fatty amines and/or fatty amine salts:

V 1 = a mixture of:
1-hexadecylamine
1-octadecylamine
1-octadecene(9)ylamine

V 2 = a mixture of:
N-octadecyl-1,3-propanediammonium dioctadecene(9)ylate
N-hexadecyl-1,3-propanediammonium dioctadecene(9)ylate
N-octadecene(9)yl-1,3-propanediammonium dioctadecene(9)ylate V 3 = a mixture of:
N-tetradecylaminopropylamine
N-hexadecylaminopropylamine
N-octadecylaminopropylamine
N-octadecene(9)ylaminopropylamine
N-octadecadiene(9,12)ylaminopropylamine V 4 = a mixture of:
N-didodecylamine
N-ditetradecylamine
N-dihexadecylamine
N-diheptadecylamine
N-dioctadecylamine
N-ditetradecene(6)ylamine
N-dihexadecene(9)ylamine
N-dioctadecene(9)ylamine V 5 = a mixture of:
N-octylaminobenzenecarboxylate
N-decylaminobenzenecarboxylate
N-dodecylaminobenzenecarboxylate
N-tetradecylaminobenzenecarboxylate
N-hexadecylaminobenzenecarboxylate
N-octadecylaminobenzenecarboxylate
N-octadecene(9)ylaminobenzenecarboxylate V 6 = a mixture of:
N-tetradecylaminooctadecene(9)ylate
N-hexadecylaminooctadecene(9)ylate
N-octadecylaminooctadecene(9)ylate
N-octadecene(9)ylaminooctadecene(9)ylate V 7 = a mixture of:
N-tetradecylaminoacetate
N-hexadecylaminoacetate
N-octadecylaminoacetate
N-octadecene(9)ylaminoacetate V 8 = a mixture of:
1-octylamine
1-decylamine
1-dodecylamine
1-tetradecylamine
1-hexadecylamine
1-octadecylamine
1-octadecene(9)ylamine These mixtures were then tested for their resistance to water vapour. Furthermore, the natural crystalline calcium carbonates treated with these amines were, in a rust preventive primer based on red lead, subjected to a test to determine their corrosion preventive action and sedimentation. The following results were obtained:

(1) Water vapour volatility:

| | |
|---|---|
| marked water vapour volatility | V 3 |
| | V 8 |
| | V 5 |
| | V 1 |
| low water vapour volatility | V 4 |
| | V 6 |
| no water vapour volatility | V 2 |
| completely soluble | V 7 |

(2) Sedimentation in a rust preventive primer

| Coating agent: | Assessment: |
|---|---|
| V 1 | strong |
| V 2 | none |
| V 3 | strong |
| V 4 | strong |
| V 5 | strong |
| V 6 | none |
| V 7 | none |
| V 8 | strong |

(3) Corrosion preventive action:

| | |
|---|---|
| Very good results: | V 2 |
| | V 3 |
| Good result | V 8 |
| Slight improvement over calcium carbonate alone | V 4 |
| Inferior compared with calcium carbonate alone | V 7 |
| | V 8 |
| | V 1 |
| | V 6 |

The foregoing tables clearly show the outstanding corrosion inhibiting action of the fatty amine salt mixture used according to the invention. A very markedly hydrophobic end product was obtained which is strongly water repellant and which, used in corrosion preventive primers, has an outstanding suspension capacity and a very high dispersibility in oily binders.

Literature relative to the state of the art (1) "Farbe und Lack", Vol. 74, December 1968, pages 1192–1194 with further literature references.

(2) Provisional Memorandum V.M. 88 of Farbwerke Hoechst AG concerning fatty amines.

A typical coating composition may comprise a vehicle and pigment. The vehicle usually includes thinner and drier whereby the composition can be spread on a surface and will dry thereof and form an adherent film on the surface. The composition of the present invention is adapted for incorporations in such a composition in an amount up to about 50 volume percent of the pigments in the composition. The present invention is, thus, concerned with a material for incorporation in a coating composition, a coating composition embodying the material, and a method of enhancing the protective capabilities of fatty amines and/or fatty amine salts.

Modifications may be made within the scope of the appended claims.

What is claimed is:

1. A corrosion inhibiting secondary pigment for use in a coating composition, said secondary pigment comprising a first material selected from the group of N-octadecene (9) yl-1,3-propanediammonium dioctadecene (9) ylate; fatty amine salts of the formula:

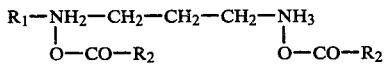

wherein $R_1$ is $CH_3-(CH_2)_n$ wherein n is an integer from 15 to 17, and $R_2$ is $CH_3-(CH_2)_7-CH=CH-(CH_2)_7$; and mixtures thereof; and a second material in the form of fine particles serving as a carrier for the first material, said first material being coated on said particles in the form of a film whereby high surface to volume ratio for said first material is established.

2. A pigment according to claim 1 in which said particles are selected from the class which includes, kaolin, barium sulphate, talc, dolomite, quartz, and calcium carbonate.

3. A pigment according to claim 1 in which said particles are calcium carbonate.

4. A pigment according to claim 1 in which said particles are natural crystal calcium carbonate.

5. A pigment according to claim 1 in which said particles in size fall within the range of from about 0.1 to about 20 microns.

6. A pigment according to claim 4 in which said particles in size fall within the range of from about 0.1 to about 20 microns.

7. A pigment according to claim 1 in which said first material comprises about 0.5 up to about 10.0 weight percent of the said secondary pigment.

8. The pigment of claim 1 wherein said first material is a mixture of N-octadecyl-1,3-propanediammonium dioctadecene (9) ylate; N-hexadecyl-1,3-propanediammonium dioctadecene (9) ylate; and N-octadecene (9) yl-1,3-propanediammonium dioctadecene (9) ylate.

9. A corrosion inhibiting coating composition comprising vehicle and pigment, the improvement comprising a corrosion inhibiting secondary pigment comprising a first material selected from the group of N-octadecene (9) yl-1,3-propanediammonium dioctadecene (9) ylate; fatty amine salt of the formula:

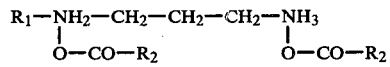

wherein $R_1$ is $CH_3-(CH_2)_n$ wherein n is an integer from 15 to 17, and $R_2$ is $CH_3-(CH_2)_7-CH=CH-(CH_2)_7$; and mixtures thereof; and a second material in the form of particles serving as a carrier for the first material, said first material being coated on said particles in the form of a film whereby high surface to volume ratio for said first material is established.

10. A coating composition according to claim 9 in which said secondary pigment is incorporated in an amount up to about 50 volume percent of the total pigment content of the composition.

11. The method of enhancing the corrosion prevention properties of a fatty amine salt in a coating material which comprises depositing a material selected from the group of N-octadecene (9) yl-1,3-propanediammonium dioctadecene (9) ylate; fatty amine salt of the formula:

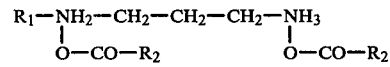

wherein $R_1$ is $CH_3-(CH_2)_n$ wherein n is an integer from 15 to 17, and $R_2$ is $CH_3-(CH_2)_7-CH=CH-(CH_2)_7$; and mixtures thereof; on particles of natural crystalline calcium carbonate as a film.

* * * * *